US009807374B2

(12) United States Patent
Kawamoto et al.

(10) Patent No.: US 9,807,374 B2
(45) Date of Patent: Oct. 31, 2017

(54) STEREOSCOPIC IMAGE CAPTURING DEVICE AND STEREOSCOPIC IMAGE CAPTURING METHOD

(71) Applicant: PANASONIC CORPORATION, Osaka (JP)

(72) Inventors: Tetsuro Kawamoto, Hiroshima (JP); Takeshi Ito, Osaka (JP); Takuma Chiba, Osaka (JP); Masanobu Inoe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 14/197,100

(22) Filed: Mar. 4, 2014

(65) Prior Publication Data
US 2014/0184753 A1 Jul. 3, 2014

Related U.S. Application Data

(63) Continuation of application No. PCT/JP2012/005244, filed on Aug. 22, 2012.

(30) Foreign Application Priority Data

Sep. 22, 2011 (JP) ................. 2011-206919

(51) Int. Cl.
*H04N 13/02* (2006.01)
*G03B 35/02* (2006.01)
*G03B 17/56* (2006.01)

(52) U.S. Cl.
CPC ....... *H04N 13/0282* (2013.01); *G03B 17/561* (2013.01); *G03B 35/02* (2013.01); *H04N 13/021* (2013.01); *H04N 13/0242* (2013.01)

(58) Field of Classification Search
CPC .......... H04N 13/0282; H04N 13/0242; H04N 13/021; G03B 17/561; G03B 35/02
(Continued)

(56) References Cited

U.S. PATENT DOCUMENTS 8,643,702 B2  2/2014 Porter et al.
2003/0179308 A1* 9/2003 Zamorano ............... A61B 5/00
                                                    348/333.12
(Continued)

FOREIGN PATENT DOCUMENTS

EP  0827349  3/1998
GB  2476685  7/2011
(Continued)

OTHER PUBLICATIONS

International Search Report issued in International Application No. PCT/JP2012/005244 with Date of mailing Nov. 20, 2012, with English Translation.
(Continued)

*Primary Examiner* — Jared Walker
(74) *Attorney, Agent, or Firm* — McDermott Will & Emery LLP

(57) ABSTRACT

A camera unit that captures and generates a plurality of images of a subject and a setting unit that sets different image capturing positions of the camera unit are provided. The setting unit sets the different image capturing positions so that the distance between an n-th image capturing position and an n+1th image capturing position and the distance between an m-th image capturing position and an m+1th image capturing position among the different image capturing positions differ from each other, where n and m are different natural numbers.

10 Claims, 8 Drawing Sheets

(58) Field of Classification Search
USPC .................................................... 348/47–48
See application file for complete search history.

(56) References Cited

U.S. PATENT DOCUMENTS

| | | | |
|---|---|---|---|
| 2003/0210461 A1* | 11/2003 | Ashizaki | G03H 1/268 359/443 |
| 2010/0295925 A1* | 11/2010 | Maier | G03B 35/10 348/47 |
| 2011/0025829 A1* | 2/2011 | McNamer | H04N 13/021 348/50 |
| 2011/0164117 A1 | 7/2011 | Porter et al. | |
| 2012/0113232 A1* | 5/2012 | Joblove | H04N 13/0242 348/48 |

FOREIGN PATENT DOCUMENTS

| | | |
|---|---|---|
| JP | 07-104211 A | 4/1995 |
| JP | 10-070741 A | 3/1998 |
| JP | 10-254079 A | 9/1998 |
| JP | 10-257528 A | 9/1998 |
| JP | 2001-326833 A | 11/2001 |
| JP | 2002-365747 A | 12/2002 |
| JP | 2004-264492 A | 9/2004 |
| JP | 2011-142632 A | 7/2011 |

OTHER PUBLICATIONS

Office Action issued in corresponding Japanese Patent Application No. 2013-534580, issued on Apr. 26, 2016.

\* cited by examiner

FIG. 4
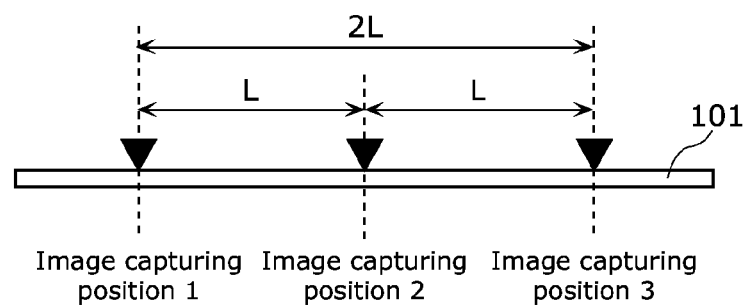
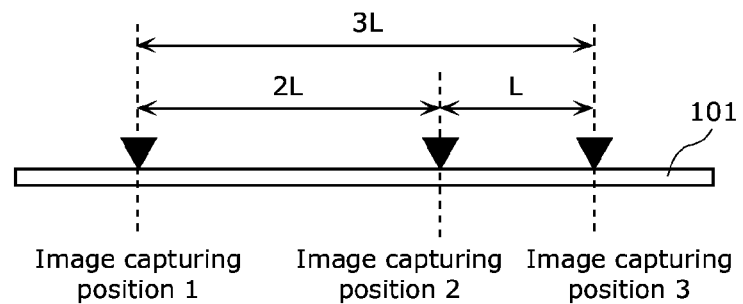

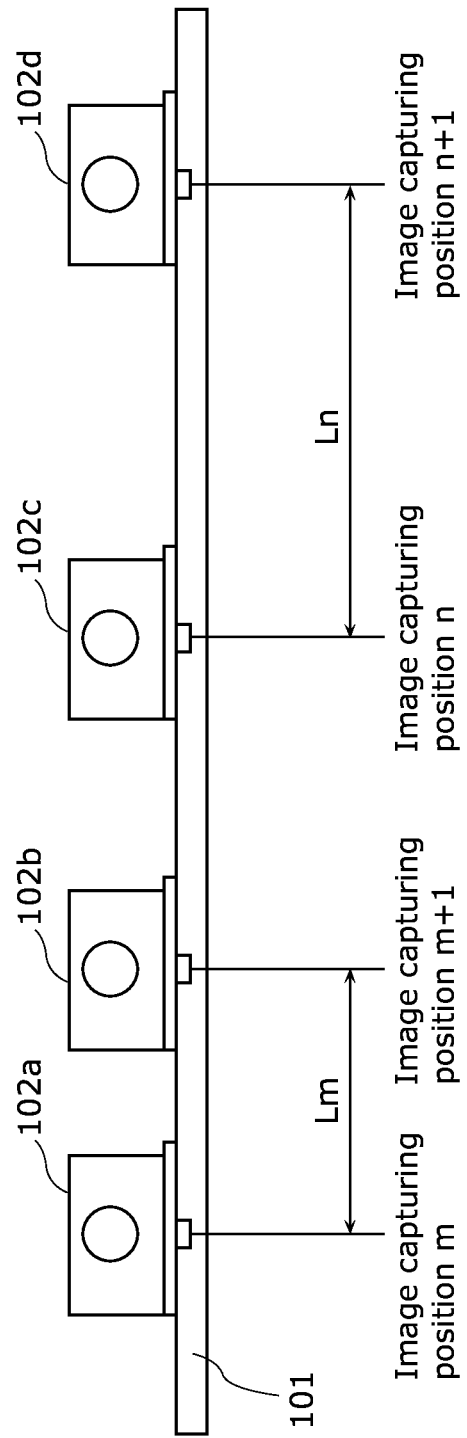

STEREOSCOPIC IMAGE CAPTURING DEVICE AND STEREOSCOPIC IMAGE CAPTURING METHOD

CROSS REFERENCE TO RELATED APPLICATION

This is a continuation application of PCT International Application No. PCT/JP2012/005244 filed on Aug. 22, 2012, designating the United States of America, which is based on and claims priority of Japanese Patent Application No. 2011-206919 filed on Sep. 22, 2011. The entire disclosures of the above-identified applications, including the specifications, drawings and claims are incorporated herein by reference in their entirety.

FIELD

The present disclosure relates to a stereoscopic image capturing device.

BACKGROUND

Patent Literature 1 discloses a camera that captures an image of a subject from different angles. In order to select a pair of images (an image pair) for a stereoscopic view from at least three images of the subject captured from different angles, this camera has an eyepiece for a monitor.

CITATION LIST

Patent Literature

[Patent Literature 1] Japanese Unexamined Patent Application Publication No. 2002-365747

SUMMARY

Technical Problem

In the image pair for a stereoscopic view, an inter-viewpoint distance, which indicates the distance between image capturing positions for capturing individual images constituting this image pair, determines a stereoscopic effect of the subject in an image (parallax).

The present disclosure provides a stereoscopic image capturing device capable of obtaining image pairs having different inter-viewpoint distances in an effective manner.

Solution to Problem

The stereoscopic image capturing device in the present disclosure is a stereoscopic image capturing device generating a plurality of images of a subject that are captured at different image capturing positions to allow a stereoscopic view of the subject. The device includes a camera unit configured to capture and generate the plurality of images of the subject, and a setting unit configured to set the different image capturing positions of the camera unit. The setting unit is configured to set the different image capturing positions, with a distance between an n-th image capturing position and an n+1th image capturing position and a distance between an m-th image capturing position and an m+1th image capturing position among the different image capturing positions differing from each other, where n and m are different natural numbers.

Advantageous Effects

According to the present disclosure, by setting the image capturing positions appropriately, it is possible to obtain image pairs having different inter-viewpoint distances in an effective manner.

BRIEF DESCRIPTION OF DRAWINGS

These and other objects, advantages and features of the invention will become apparent from the following description thereof taken in conjunction with the accompanying drawings that illustrate a specific embodiment of the present disclosure.

FIG. 4 is a diagram for describing combinations of image capturing intervals.

FIG. 8 illustrates a configuration of a stereoscopic image capturing device including a plurality of camera units.

DESCRIPTION OF EMBODIMENT

Hereinafter, embodiments will be described in detail with reference to accompanying drawings as needed. It should be noted that an excessively detailed description may be omitted in some cases. For example, a detailed description of a well-known matter and a redundant description of substantially the same configuration may be sometimes omitted. This is to prevent the following description from becoming too lengthy, thereby facilitating the understanding of those skilled in the art.

Incidentally, the present inventors provide attached drawings and the following description so that those skilled in the art can fully understand the present disclosure, and do not intend to limit the subject matters recited in claims by these drawings and description.

Embodiment

The present disclosure is directed to a stereoscopic image capturing device capturing images to be used as a left-eye image and a right-eye image that constitute a stereoscopic image. From a plurality of images of the same subject that have been captured at different image capturing positions, two images are selected and used as the left-eye image and the right-eye image, thereby making it possible to generate stereoscopic images having different parallaxes (inter-viewpoint distances). The present embodiment will disclose the stereoscopic image capturing device that generates the stereoscopic images having different parallaxes in an efficient manner.

In the following, an embodiment will be described with reference to FIGS. 1 to 7.

[1-1. Configuration]

Figure 1:
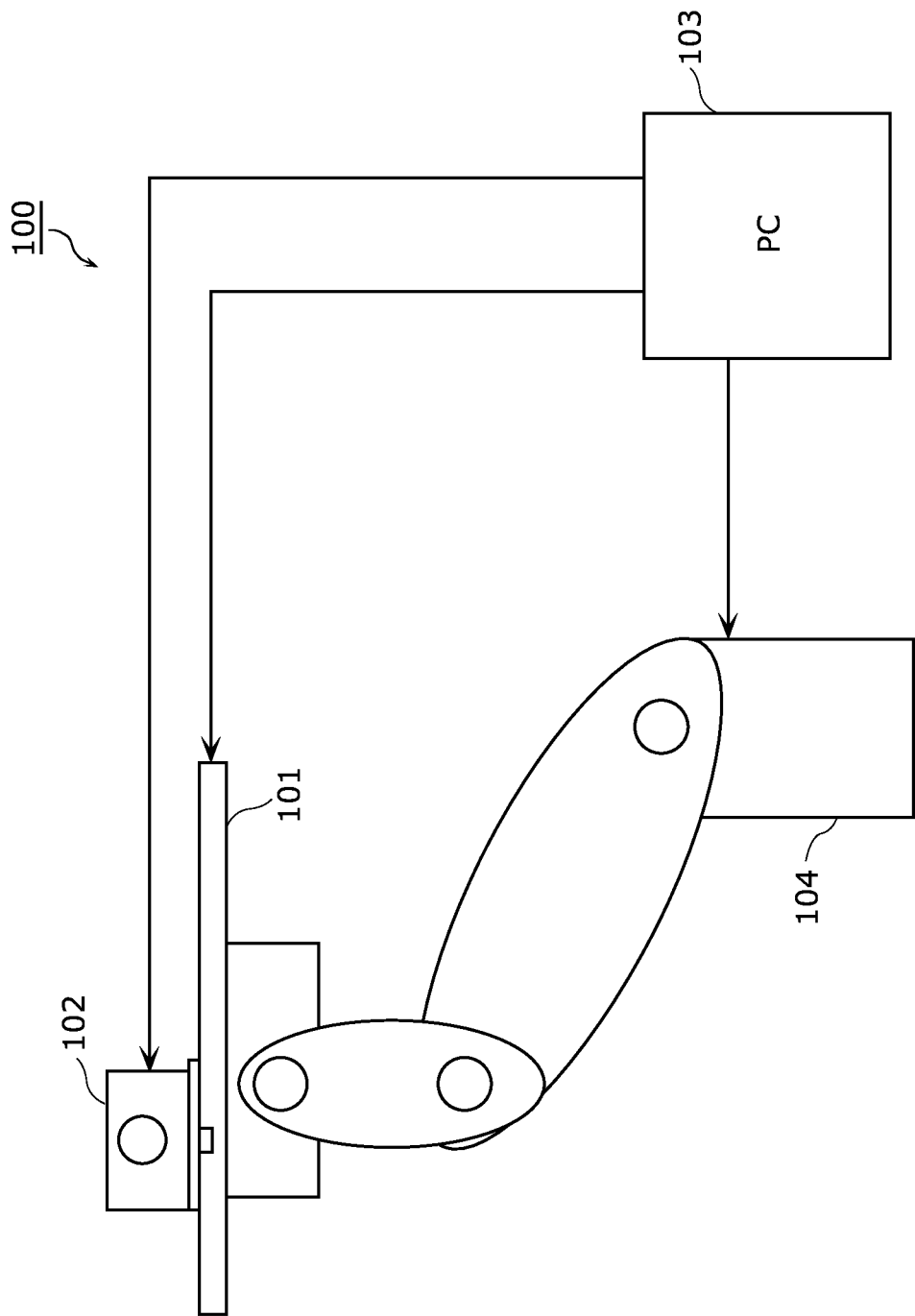
FIG. 1 illustrates a configuration of a stereoscopic image capturing device according to an embodiment.

FIG. 1 illustrates a configuration of a stereoscopic image capturing device according to the present embodiment.

A stereoscopic image capturing device 100 according to the present embodiment includes a slider 101 (a moving unit), a camera unit 102, a PC 103 (a setting unit) and a robot arm 104.

The slider 101 is a member for moving the camera unit 102 linearly. When an image capturing position control signal is inputted from the PC 103, the slider 101 moves the camera unit 102 to an image capturing position indicated by this image capturing position control signal. The slider 101 includes a mechanism capable of moving the camera unit 102 according to the number of revolutions of a stepping motor, for example. In this case, the number of revolutions of the stepping motor is controlled according to the image capturing position control signal, whereby the camera unit 102 can move to the image capturing position. The camera unit 102 is made to move by the slider 101 so as to generate images (image data) of the same subject that are captured from different image capturing positions.

In this manner, the images from different image capturing positions are used as a left-eye image and a right-eye image that constitute a stereoscopic image.

The camera unit 102 captures images of the subject based on a camera control signal from the PC 103 and generates the image data. The camera unit 102 is arranged at the image capturing position by the slider 101. Incidentally, when capturing images of the same subject from different image capturing positions, the camera unit 102 is under the same image capturing condition. Here, the image capturing condition includes at least white balance, an aperture value, a focal position, an exposure value and a shutter speed.

The PC 103 sets a plurality of image capturing positions at which the camera unit 102 captures the images of the subject, and controls the slider 101 so that the camera unit 102 is arranged at these image capturing positions. Note that how the PC 103 sets the plurality of image capturing positions will be explained later.

Additionally, the PC 103 controls the robot arm 104. More specifically, the PC 103 outputs a control signal to the robot arm 104 based on a user operation. In this way, the user can move the slider 101 and the camera unit 102 to a targeted image capturing scene (an image capturing location).

After moving the slider 101 and the camera unit 102, the PC 103 further causes the slider 101 to move the camera unit 102, thus capturing an image of the subject. Accordingly, the camera unit 102 can generate a plurality of images with different image capturing positions in the same image capturing scene.

Further, the PC 103 controls an image capturing operation of the camera unit 102. More specifically, the PC 103 moves the camera unit 102 to a set image capturing position and then executes the image capturing operation of the camera unit 102. Consequently, the camera unit 102 can capture and generate images of the subject at the set image capturing positions.

When a control signal is inputted from the PC 103, the robot arm 104 moves the slider 101 and the camera unit 102 to a position indicated by this control signal. In this way, the slider 101 and the camera unit 102 can move their upper, lower, right and left image capturing positions to an image capturing scene in which the user intends to capture the images. It should be noted that the robot arm 104 may be any robot arm as long as it is capable of moving the slider 101 and the camera unit 102 to the image capturing scene. For example, the robot arm 104 may be a robot arm having n joints (n is a natural number).

Now, the image capturing positions set by the PC 103 will be described with reference to accompanying drawings.

Figure 2:
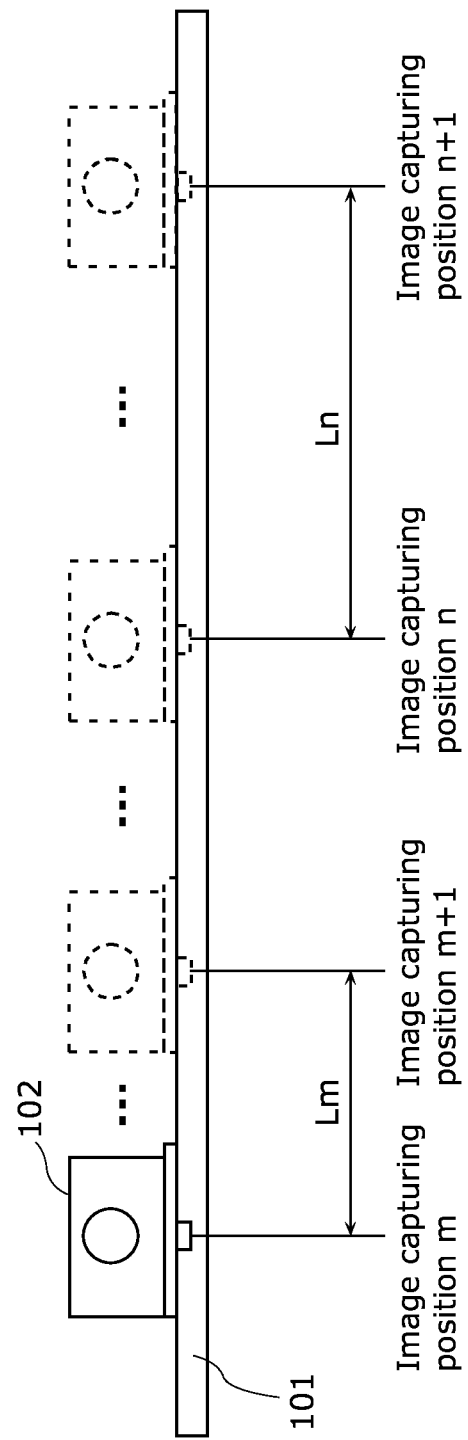
FIG. 2 is a diagram for describing image capturing positions of a camera unit.

FIG. 2 is a diagram for describing the image capturing positions of the camera unit 102 set by the PC 103.

Figure 3:
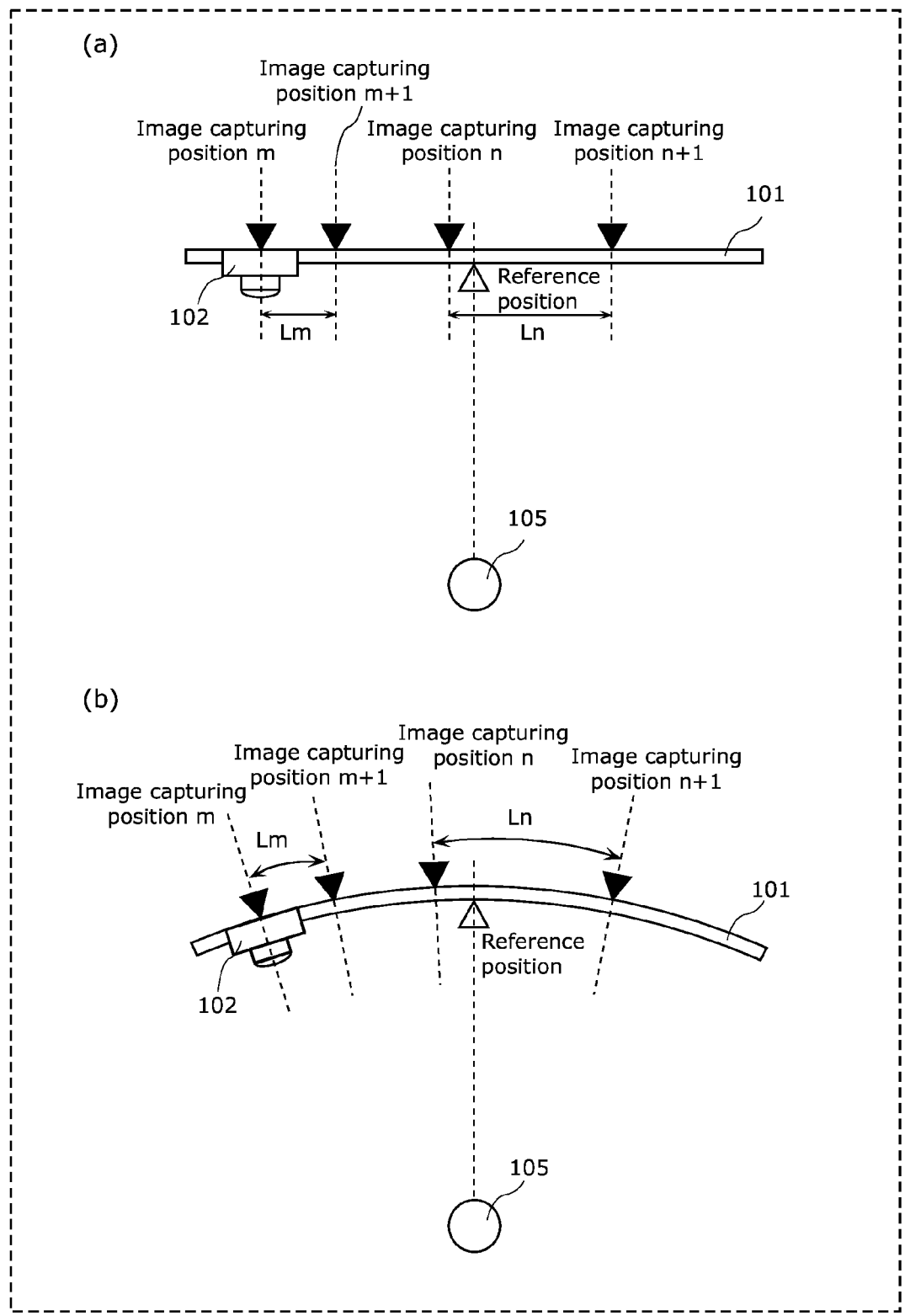
FIG. 3 is a top view for describing the image capturing positions of the camera unit.

FIG. 3 is a top view for describing the image capturing positions of the camera unit 102 set by the PC 103. Note that black triangles in FIG. 3 indicate the image capturing positions and a white triangle indicates a predetermined reference position. The reference position is, for example, a front of the subject. Also, the reference position may be an image capturing position serving as a reference when the subject is seen in a planar manner (when a planar image of the subject is captured). In the example of FIG. 3, the reference position is a midpoint of the slider 101 that has a linear or curved shape. Particularly, in (a) of FIG. 3, a straight line connecting the subject 105 and the reference position is substantially perpendicular to the linear slider.

As shown in FIG. 2, the camera unit 102 captures images of the subject at three or more image capturing positions. In other words, the PC 103 sets at least three image capturing positions. In the following, the distance between mutually different image capturing positions is also referred to as an image capturing interval.

Here, Lm denotes the image capturing interval between image capturing positions m and m+1 that are adjacent to each other. Also, Ln denotes the image capturing interval between image capturing positions n and n+1 that are adjacent to each other. Note that m and n are natural numbers and differ from each other.

Further, as shown in (a) of FIG. 3, the slider 101 in the present embodiment has a linear shape when seen from a top view direction. Thus, the image capturing positions m, m+1, n and n+1 are aligned in this order when seen from the top view direction.

Incidentally, the slider 101 need not have a linear shape when seen from the top view direction, but may have a curved shape as shown in (b) of FIG. 3. The curvature of the curved shape is set considering the distance from the subject 105 to the slider 101 so that the user can view the subject 105 naturally and stereoscopically. In this case, the distance between the image capturing positions is the distance along the shape of the slider 101.

In the present embodiment, the PC 103 sets the image capturing intervals of the camera unit 102 so that at least Lm and Ln differ from each other. In other words, the PC 103 sets a plurality of the image capturing positions so that an inter-image capturing position distance in a first image capturing position set, which is a set of two adjacent image capturing positions, and an inter-image capturing position distance in a second image capturing position set, which is a set of two adjacent image capturing positions that differ from those in the first image capturing position set, differ from each other.

In this way, when two images are selected from the images captured at all of the image capturing positions, the number of combinations of images having different image capturing intervals increases compared with the case where all of the image capturing intervals between the adjacent image capturing positions are the same. In other words, the combination of stereoscopic images having different parallaxes increases in number.

FIG. 4 is a diagram for describing the combinations of the image capturing intervals. FIG. 4 illustrates an exemplary case in which three image capturing positions, which are image capturing positions 1, 2 and 3, are set in this alignment order.

Here, (a) in FIG. 4 corresponds to the case in which all of the image capturing intervals between the adjacent image capturing positions have the same length L. In this case, the image capturing intervals have two possible lengths of L and 2L.

On the other hand, (b) in FIG. 4 corresponds to the case in which the image capturing interval between the image capturing positions 1 and 2 differs in length from the image capturing interval between the image capturing positions 2 and 3. In this case, the image capturing interval between the image capturing positions 1 and 2 has a length of 2L, whereas the image capturing interval between the image capturing positions 2 and 3 has a length of L. Therefore, the image capturing intervals have three possible lengths of L, 2L and 3L.

Incidentally, the PC 103 may set the image capturing positions of the camera unit 102 so that all of the adjacent image capturing intervals differ from each other.

Figure 5:
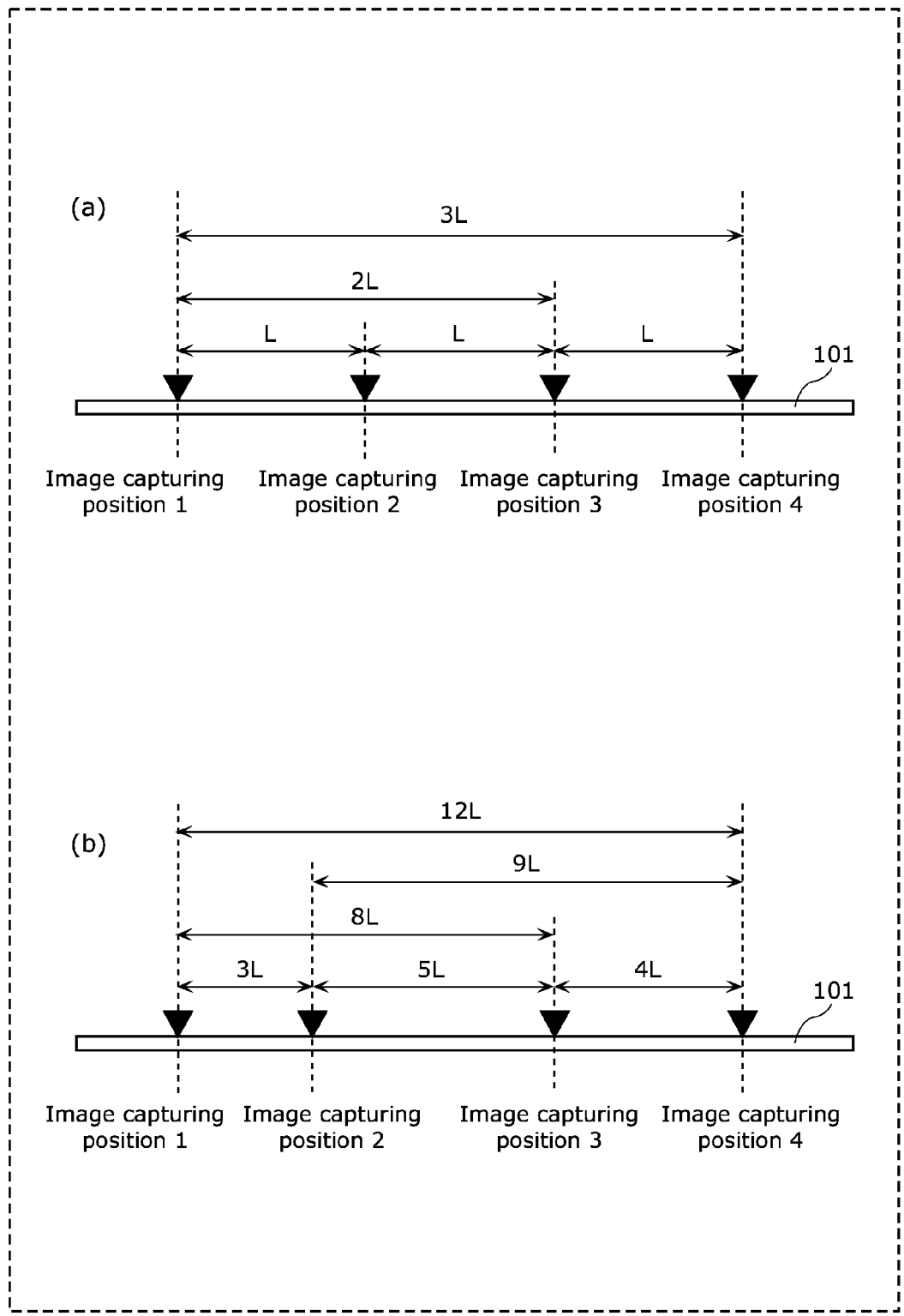
FIG. 5 is a diagram for describing a case in which the number of the combinations of image capturing intervals is maximal.

FIG. 5 is a diagram for describing a case in which the number of the combinations of the image capturing intervals is maximal. FIG. 5 illustrates an exemplary case in which four image capturing positions, which are image capturing positions 1, 2, 3 and 4, are set in this alignment order.

Here, (a) in FIG. 5 corresponds to the case in which all of the image capturing intervals between the adjacent image capturing positions have the same length L. In this case, the image capturing intervals have three possible lengths of L, 2L and 3L.

On the other hand, (b) in FIG. 5 corresponds to the case in which all of the image capturing intervals between the adjacent image capturing positions differ from each other. In this case, the image capturing intervals have six possible lengths of 3L, 4L, 5L, 8L, 9L and 12L.

It should be noted that (b) in FIG. 5 illustrates an exemplary case in which all of the image capturing intervals between the adjacent image capturing positions differ from each other and the number of the different image capturing intervals is maximal. In other words, (b) in FIG. 5 illustrates the image capturing positions that are set so that distances between all pairs obtainable from a plurality of the image capturing positions differ from each other.

The above description can be rephrased as follows. When the PC 103 sets b image capturing positions (b is a natural number greater than 2), there can be bC2 possible combinations of the image capturing positions. (Here, C is a sign representing a combination.) Thus, (b) in FIG. 5 illustrates the case in which the PC 103 sets the image capturing positions so that all of the inter-image capturing position distances in the bC2 combinations of the image capturing positions differ from each other.

This makes it possible to maximize the number of combinations of the image capturing intervals.

By setting the image capturing positions as described above, it is possible to increase the number of combinations of images with different image capturing intervals without increasing the number of images to be captured.

It should be noted that how the PC 103 sets the image capturing positions is not limited to the above description.

Figure 6:
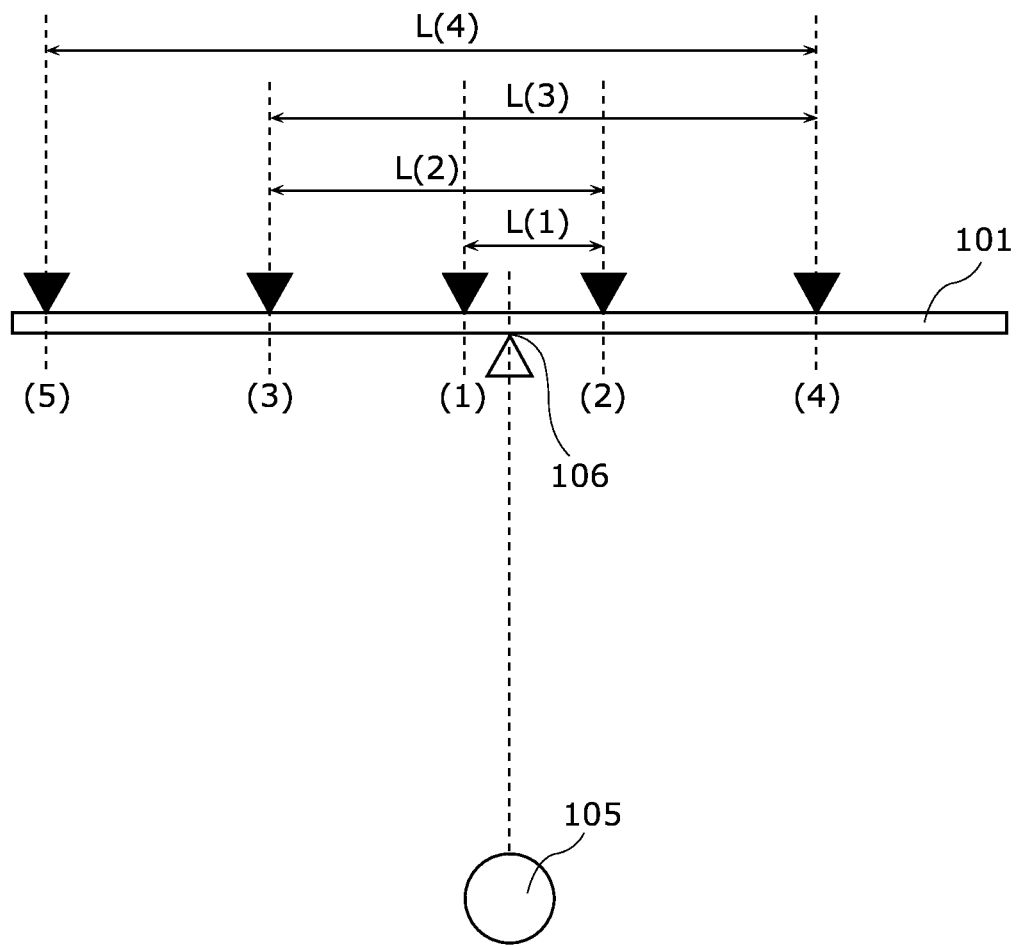
FIG. 6 is a top view showing another example of how to set the image capturing positions of the camera unit.

FIG. 6 is a top view showing another example of how to set the image capturing positions.

A reference position 106 shown in FIG. 6 is a front position of the subject 105.

Here, in FIG. 6, the PC 103 sets image capturing positions (1), (2), (3), (4) and (5) in this order.

At this time, the PC 103 sets the image capturing positions so that the reference position 106 is present between the image capturing positions that are set consecutively. For example, in FIG. 6, the reference position 106 is present between the positions (1) and (2), and the reference position 106 is also present between the positions (2) and (3).

Further, in FIG. 6, L(a) denotes the distance between an a-th image capturing position (a is a natural number) and an a+1th image capturing position. More specifically, L(1) denotes the distance between the positions (1) and (2), and L(2) denotes the distance between the positions (2) and (3).

Here, the PC 103 sets the image capturing positions so that $L(1)<L(2)<L(3)<L(4)<L(5)$. In other words, the image capturing positions are set sequentially so that a viewpoint interval increases gradually.

By setting the image capturing positions as described above, it becomes easier to obtain image pairs, each having a reference position within its image capturing interval, that have different image capturing intervals. Consequently, it becomes easier to obtain a stereoscopic image that is close to an image viewed from a viewpoint in the case of seeing the subject 105 in a planar manner and has different parallaxes.

[1-2. Operation]

The operation of the stereoscopic image capturing device 100 configured as above will be described herein.

Figure 7:
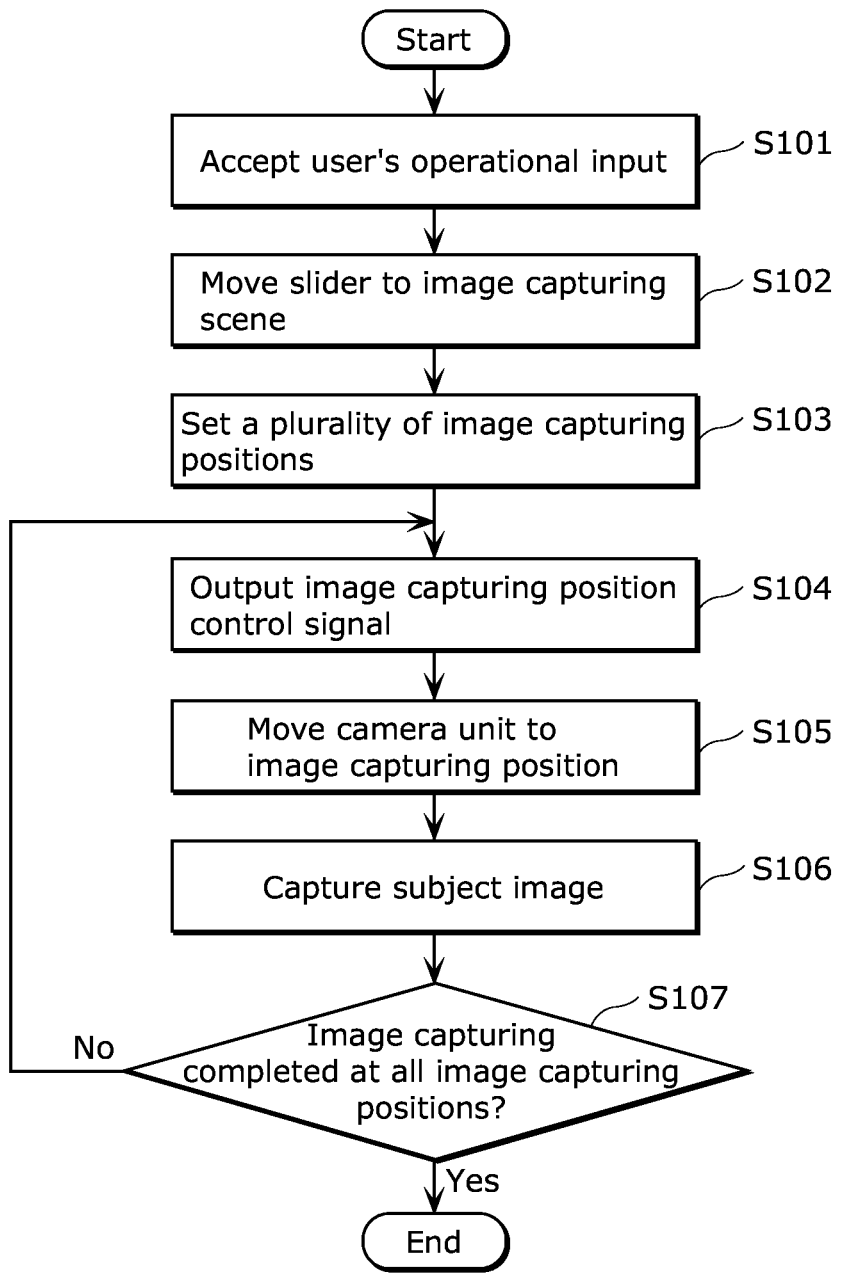
FIG. 7 is a flowchart for explaining an image capturing procedure of the stereoscopic image capturing device.

FIG. 7 is a flowchart showing the operation of the stereoscopic image capturing device 100. Incidentally, steps in the flowchart of FIG. 7, the order of these steps, etc. are mere examples.

First, the PC 103 accepts an operational input of a user (S101). At this time, the user inputs information regarding an image capturing scene. The PC 103 outputs a control signal to the robot arm 104 based on the inputted information regarding an image capturing scene.

Next, the robot arm 104 moves the slider 101 to the image capturing scene based on the control signal (S102). This allows the camera unit 102 attached to the slider 101 to capture an image of the subject 105 at the targeted image capturing scene.

Then, the PC 103 sets a plurality of image capturing positions at which the camera unit 102 captures images of the subject at the image capturing scene (S103).

Subsequently, the PC 103 outputs to the slider 101 an image capturing position control signal indicating one image capturing position among the plurality of image capturing positions set in Step S103 (S104).

When the slider 101 receives the image capturing position control signal from the PC 103, it moves the camera unit 102 to the image capturing position indicated by this image capturing position control signal (S105).

After the slider 101 moves the camera unit 102 to the image capturing position, the PC 103 outputs a camera control signal to the camera unit 102, and the camera unit 102 captures an image of the subject 105 at that image capturing position (S106). In this manner, the user can capture the image of the subject 105 at the targeted image capturing scene and at the targeted image capturing position.

The next step determines whether the PC 103 has outputted image capturing position control signals regarding all of the targeted image capturing positions to the slider 101 (S107). If the PC 103 has not outputted all of the image capturing position control signals (No in S107), the operations in Steps S104 to S106 are executed with respect to a not-yet-outputted image capturing position control signal and an image capturing position indicated by this image capturing position control signal. On the other hand, if the PC 103 has already outputted all of the image capturing position control signals (Yes in S107), the operation of the stereoscopic image capturing device 100 ends.

[1-3. Effects, etc.]

As described above, in the present embodiment, the stereoscopic image capturing device 100 includes the camera unit 102 that captures and generates images of the subject, the PC 103 that sets a plurality of image capturing positions of the camera unit 102 in order to view the subject stereoscopically using a plurality of the images, and the slider 101 that moves the camera unit 102 to each of the plurality of image capturing positions set by the PC 103. The PC 103 sets the plurality of image capturing positions so that the distance Ln between n-th and n+1th image capturing positions that are adjacent to each other and the distance Lm between m−th and m+1th image capturing positions that are adjacent to each other among the plurality of image capturing positions differ from each other (n and m are different integers).

With the configuration described above, it is possible to provide more image pairs having different image capturing intervals than in the case where the image capturing intervals are even. In other words, it is possible to increase the number of image pairs having different image capturing intervals without increasing the number of images to be captured, so that images for a stereoscopic view can be captured efficiently.

Additionally, the PC 103 may set a plurality of image capturing positions so that the distances between adjacent image capturing positions among the plurality of image capturing positions differ from each other.

In this manner, the number of combinations of the image capturing intervals can be increased further.

Moreover, the PC 103 may set the plurality of image capturing positions so that distances between all pairs obtainable from the plurality of image capturing positions set by the PC 103 differ from each other.

In this manner, the number of combinations of the image capturing intervals can be maximized.

Further, when L(a) denotes the distance between an a−th image capturing position (a is a natural number) and an a+1th image capturing position that are set by the PC 103, the PC 103 may set the plurality of image capturing positions so that a predetermined reference position is present between the a−th and a+1th image capturing positions and L(a+1) is greater than L(a).

This makes it easier to obtain a stereoscopic image that is close to an image in the case of seeing the subject in a planar manner from the predetermined reference position and has different parallaxes.

Embodiment Variations

The embodiment has been described above as an exemplary technology disclosed in the present application. However, the technology in the present disclosure is not limited to the above but is also applicable to embodiments that have gone through modifications, substitutions, additions, omissions, etc. as necessary. It is also possible to provide another embodiment by combining the individual structural components described in the above embodiment.

For example, although the above embodiment has been directed to the example of moving one camera unit 102 to image capturing positions, the stereoscopic image capturing device may include a plurality of camera units.

FIG. 8 illustrates a configuration of a stereoscopic image capturing device including a plurality of camera units.

The stereoscopic image capturing device shown in FIG. 8 includes four camera units 102a to 102d on the slider 101. The slider 101 arranges the four camera units 102a to 102d to image capturing positions m, m+1, n and n+1, respectively.

The use of a plurality of camera units as above is effective when capturing a stereoscopically-viewable moving image because timing of capturing an image of the subject can be matched among the individual image capturing positions.

Further, the cases below are also within the scope of the present disclosure.

(1) Each of the above-described devices can be specifically realized by a computer system constituted by a microprocessor, a ROM, a RAM, a hard disk unit, a display unit, a keyboard, a mouse, etc. The RAM or the hard disk unit stores a computer program. The microprocessor operates according to the computer program, whereby each of the devices achieves its function. Here, the computer program is configured by combining a plurality of instruction codes indicating a command to a computer for achieving a predetermined function.

(2) Part or all of the structural components constituting each of the above-described devices may be formed of a single system LSI (Large Scale Integration). The system LSI is a super-multifunctional LSI produced by integrating a plurality of structural portions onto a single chip and, more specifically, is a computer system including a microprocessor, a ROM, a RAM, etc. The ROM stores a computer program. The microprocessor loads the computer program from the ROM to the RAM and performs operations such as a computation according to the loaded computer program, whereby the system LSI achieves its function.

(3) Part or all of the structural components constituting each of the above-described devices may be formed of an IC card detachable from/attachable to each of the devices or a single module. The IC card or the module is a computer system constituted by a microprocessor, a ROM, a RAM, etc. The IC card or the module may include the super-multifunctional LSI mentioned above. The microprocessor operates according to a computer program, whereby the IC card or the module achieves its function. This IC card or module may have a tamper resistance.

(4) The present disclosure may be realized by the method described above. Also, the present disclosure may be realized by a computer program realizing such a method in a computer or by a digital signal composed of the computer program.

Further, the present disclosure may be realized by a computer-readable recording medium, for example, a flexible disk, a hard disk, a CD-ROM, an MO, a DVD, a DVD-ROM, a DVD-RAM, a BD (Blu-ray® Disc), a semiconductor memory or the like on which the computer program or the digital signal are recorded. Additionally, the present disclosure may be realized by the digital signal recorded in these recording media.

Moreover, the present disclosure may transmit the computer program or the digital signal via a telecommunications line, a wireless or wired communication line, a network represented by the Internet, a data broadcasting, etc.

Furthermore, the present disclosure may be a computer system including a microprocessor and a memory. The memory may store the computer program, and the microprocessor may operate according to the computer program.

Also, by transferring the program or the digital signal recorded in a recording medium or by transferring the program or the digital signal via a network or the like, the present disclosure may be implemented by another independent computer system.

(5) The above-described embodiments and the above-described variations may be combined individually.

The embodiments have been described above as an exemplary technology in the present disclosure. For that purpose, the attached drawings and the detailed description have been provided.

Thus, in order to illustrate the above-noted technology, the structural components appearing in the attached drawings and the detailed description could include not only a structural component that is essential for solving the problem but also a structural component that is not essential therefor. Accordingly, from the appearance of that non-essential structural component in the attached drawings and the detailed description, such a non-essential structural component should not immediately be considered as essential.

Since the above-described embodiments have been provided for illustrating a technology in the present disclosure, they can go through various modifications, substitutions, additions, omissions, etc. within the scope of the claims or the range of their equivalency.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to an imaging device such as a digital still camera that captures images for a stereoscopic view.

The invention claimed is:

1. A stereoscopic image capturing apparatus comprising:
   at least one camera capable of capturing a subject; and
   a camera holder configured to hold the at least one camera, the camera holder having at least a first image capturing position, a second image capturing position, and a third image capturing position,
   wherein the first image capturing position, the second image capturing position and the third image capturing position are arranged on a line,
   wherein the stereoscopic image capturing apparatus is configured to output at least:
   a first stereoscopic image with a first image of the subject captured by the at least one camera at the first image capturing position and a second image of the subject captured by the at least one camera at the second image capturing position, and
   a second stereoscopic image with the second image and a third image of the subject captured by the at least one camera at the third image capturing position,
   wherein a first distance between the first image capturing position and the second image capturing position, is shorter than a second distance between the second image capturing position and the third image capturing position,
   wherein a reference point is located on the line other than at an image capturing position, and between the first image capturing position and the second image capturing position which are set consecutively, and between the second image capturing position and the third image capturing position which are set consecutively, and
   wherein a straight line connecting the subject and the reference point is substantially perpendicular to the line.

2. The stereoscopic image capturing apparatus according to claim 1,
   wherein the camera holder further has a fourth image capturing position,
   wherein the fourth image capturing position is arranged on the line,
   wherein the stereoscopic image capturing apparatus is configured to output:
   a third stereoscopic image with the third image and a fourth image of the subject captured by the at least one camera at the fourth image capturing position,
   wherein the second distance is shorter than a third distance between the third image capturing position and the fourth image capturing position, and
   wherein the reference point is further located between the third image capturing position and the fourth image capturing position.

3. The stereoscopic image capturing apparatus according to claim 2,
   wherein the camera holder further has a fifth image capturing position,
   wherein the fifth image capturing position is arranged on the line,
   wherein the stereoscopic image capturing apparatus is configured to output:
   a fourth stereoscopic image with the fourth image and a fifth image of the subject captured by the at least one camera at the fifth image capturing position,
   wherein the third distance is shorter than a fourth distance between the fourth image capturing position and the fifth image capturing position, and
   wherein the reference point is further located between the fourth image capturing position and the fifth image capturing position.

4. The stereoscopic image capturing apparatus according to claim 1,
   wherein the camera holder comprises a slider capable of moving on the line.

5. The stereoscopic image capturing apparatus according to claim 4, further comprising:
   a robot arm,
   wherein the slider is capable of being moved by the robot arm.

6. The stereoscopic image capturing apparatus according to claim 1,
   wherein the first distance is different from a third distance between the first image capturing position and the third image capturing position.

7. The stereoscopic image capturing apparatus according to claim 1,
   wherein the line on which the first image capturing position, the second image capturing position and the third image capturing position are arranged, is a straight line.

8. The stereoscopic image capturing apparatus according to claim 1,
   wherein the line on which the first image capturing position, the second image capturing position and the third image capturing position are arranged, is a curved line.

9. The stereoscopic image capturing apparatus according to claim 1,
  wherein the at least one camera comprises a first camera and a second camera, and
  wherein the camera holder holds the first camera at the first image capturing position and the second camera at the second image capturing position.

10. The stereoscopic image capturing apparatus according to claim 1,
  wherein the at least one camera comprises a first camera, a second camera, and a third camera, and
  wherein the camera holder holds the first camera at the first image capturing position, the second camera at the second image capturing position, and the third camera at the third image capturing position.

\* \* \* \* \*